(12) United States Patent
Holloway et al.

(10) Patent No.: US 11,549,810 B2
(45) Date of Patent: Jan. 10, 2023

(54) LASER LEVEL DEVICE

(71) Applicants: Robyn Holloway, Toluca Lake, CA (US); Daniel Yaakov Arato, Los Angeles, CA (US)

(72) Inventors: Robyn Holloway, Toluca Lake, CA (US); Daniel Yaakov Arato, Los Angeles, CA (US)

( * ) Notice: Subject to any disclaimer, the term of this patent is extended or adjusted under 35 U.S.C. 154(b) by 208 days.

(21) Appl. No.: 17/126,778

(22) Filed: Dec. 18, 2020

(65) Prior Publication Data

US 2022/0196402 A1   Jun. 23, 2022

(51) Int. Cl.
*G01C 9/06*    (2006.01)
*G01C 15/00*   (2006.01)
*G01C 15/12*   (2006.01)

(52) U.S. Cl.
CPC ............. *G01C 9/06* (2013.01); *G01C 15/004* (2013.01); *G01C 15/12* (2013.01)

(58) Field of Classification Search
None
See application file for complete search history.

(56) References Cited

U.S. PATENT DOCUMENTS

| | | | | |
|---|---|---|---|---|
| 5,394,616 A | * | 3/1995 | Claxton | G01C 15/002 33/275 R |
| 5,519,942 A | * | 5/1996 | Webb | G01C 15/008 33/290 |
| 5,531,031 A | * | 7/1996 | Green | G01C 15/008 33/286 |
| 5,713,135 A | * | 2/1998 | Acopulos | G01C 15/008 33/286 |
| 6,012,229 A | * | 1/2000 | Shiao | G01C 15/008 33/227 |

(Continued)

FOREIGN PATENT DOCUMENTS

| | | | | |
|---|---|---|---|---|
| CN | 108592744 A | * | 9/2018 | ........... G01B 5/0035 |
| JP | 2004093275 A | | 3/2004 | |
| WO | WO-2010026569 A2 | * | 3/2010 | ............. G01B 11/27 |

OTHER PUBLICATIONS

"Sinotech Digital Display Vertical+horizontal Angle Finder Level Marker 0-160 Laser Range Multifunction Instrument St1b", https://www.amazon.com/Sinotech-Vertical-horizontal-Multifunction-Instrument/dp/B00FHMH0F0.

(Continued)

*Primary Examiner* — Christopher W Fulton
(74) *Attorney, Agent, or Firm* — Cynthia S. Lamon; Lamon Patent Services

(57) ABSTRACT

A laser-level device has a body having a length, a height and a width, with a base, sides and a top, an upper slider engaging a longitudinal track along the top of the device, connected through a lengthwise channel to a lower slider element within the body, a laser module carrying a laser, engaged in a track curved in an arc of about ninety degrees, and a first link engaged pivotally to the lower slider element on a first end and pivotally to the laser module on a second end. The laser module follows the track curvature in response to translation of the slider along the longitudinal track from a fully retracted position to a fully extended position, and the laser emits a laser beam through the central, lengthwise channel, the beam moving in an arc determined by the track curvature.

15 Claims, 6 Drawing Sheets

(56) References Cited

U.S. PATENT DOCUMENTS

| | | | | |
|---|---|---|---|---|
| 6,052,911 | A * | 4/2000 | Davis | G01B 11/27 |
| | | | | 33/529 |
| 6,360,446 | B1 * | 3/2002 | Bijawat | G01C 15/008 |
| | | | | 33/286 |
| 6,839,974 | B1 * | 1/2005 | Hitchcock | B43L 7/12 |
| | | | | 33/DIG. 1 |
| 6,954,990 | B2 | 10/2005 | Ellis | |
| 7,240,437 | B1 * | 7/2007 | Moldovan | B25H 7/005 |
| | | | | 33/529 |
| 7,287,336 | B1 | 10/2007 | Goodrich et al. | |
| 7,373,727 | B2 | 5/2008 | Bruce | |
| 8,336,221 | B2 * | 12/2012 | Steele | G01C 9/24 |
| | | | | 33/528 |
| 9,546,867 | B2 | 1/2017 | Lueck et al. | |
| 10,996,047 | B2 * | 5/2021 | Barr | G01S 7/4813 |
| 2006/0213069 | A1 * | 9/2006 | Martin | G01C 15/008 |
| | | | | 33/286 |
| 2011/0138643 | A1 * | 6/2011 | Gao | G01B 3/56 |
| | | | | 33/465 |

OTHER PUBLICATIONS

The New & Improved Bosch Angle Finder, https://www.thisiscarpentry.com/2010/11/05/new-improved-bosch-angle-finder/, https://www.thisiscarpentry.com/2010/11/05/new-improved-bosch-angle-finder/.

Bear Tools, "Laser Angle Finder Square", https://www.amazon.ca/BearTools-Laser-Angle-Finder-Sqaure/dp/B00VUGBEXU.

"Digital Laser Level Angle Finder Incline 9" Protractor Electronic Gauge Slope Angle Projects Level Plumb Line Surface Magnetic Edge Measuring tool, https://www.dbmimports.com/Digital-Laser-Level-Angle-Finder-Incline-9-Protractor-Electronic-Gauge-Slope-Angle-Projects-Level-Plumb-Line-Surface-Magnetic-Edge-Measuring-tool_p_2460.html.

* cited by examiner

LASER LEVEL DEVICE

BACKGROUND OF THE INVENTION

1. Field of the Invention

The present invention is in the technical area of devices used in measurement and construction and pertains more particularly to a level device having in addition a laser apparatus for determining angles between objects accurately.

2. Description of Related Art

Leveling devices are well known in the art, and conventionally have bubble level tubes for indicating whether a surface is or is not level with respect to gravity. It is known in the art to add other functionality to such a device, but as of the time of the instant patent application a mechanism with functionality to accurately measure angular differential between two points in a three-dimensional space has not been accomplished.

What is therefore needed is a leveling device that comprises a manipulatable laser apparatus that may be used to establish the device at a first point, and to train the laser on a second point, and to read out the angular differential between the two points.

BRIEF SUMMARY OF THE INVENTION

In an embodiment of the invention a laser-level device is provided, comprising a body having a length, a height and a width, with a base, sides and a top, an upper slider engaging a longitudinal track along the top of the device, connected through a lengthwise channel to a lower slider element within the body, a laser module carrying a laser, engaged in a track curved in an arc of about ninety degrees, and a first link engaged pivotally to the lower slider element on a first end and pivotally to the laser module on a second end. The laser module follows the track curvature in response to translation of the slider along the longitudinal track from a fully retracted position to a fully extended position, and the laser emits a laser beam through the central, lengthwise channel, the beam moving in an arc determined by the track curvature.

In one embodiment the device further comprises curved window on a first side of the body of the device, and a first pointer extending laterally from the laser module, wherein the pointer follows the curvature of the curved window. Also, in one embodiment the device further comprises indicia along the curved window indicating arcuate rotation of the laser beam from a position with the slider fully retracted to a position with the slider fully extended. In one embodiment the device further comprises a second link engaged pivotally to the lower slider element on a first end and pivotally to the laser module on a second end, the second link on a side of the curved track opposite the first link, and further comprising a second curved window on a second side of the body of the device and a second pointer extending laterally from the laser module opposite the first pointer, with indicia along both the first and the second window indicating arcuate rotation of the laser beam from a position with the slider fully retracted to a position with the slider fully extended. And in one the body is no more than one inch in width and no more than two inches in height.

In one embodiment the body is based on an aluminum extrusion. Also, in one embodiment the device further comprises an electromechanical modular assembly comprising the laser module carrying a laser, the curved track, the lower slider element links engaged pivotally to the slider on a first end and pivotally to the laser module on a second end, the electromechanical modular assembly engaged to the body via an opening in the base of the body. In one embodiment the curved track is non-circular, radius of track increasing as the first slider extends further along the longitudinal track. In one embodiment the device further comprises end caps engaging the body at openings on opposite ends. And in one embodiment one of the end caps has a horizontal bubble level and a vertical bubble level.

In one embodiment the electromechanical assembly further comprises a printed circuit board providing control functions, a battery providing power and an on-off switch that activates the laser. In one embodiment the body has a pointer on one side at a midpoint at the base, such that with the device resting on the base on a surface, with a point on the surface aligned with the pointer, the laser beam, with the first slider fully retracted, defines a vertical line through the pointer and the point on the surface. And in one embodiment the device further comprises one or more lengthwise channels along the top of the device, the channels having V-angled sides, such that that the device may be engaged to a conduit or a pipe along one of the channels.

In another aspect of the invention a method determining angular separation between a first point and a second point on one or more surfaces is provided, comprising placing a laser-level device having a body with a length, a height and a width, a base, sides and a top, with a upper slider engaging a longitudinal track along the top of the device, connected through a lengthwise channel to a lower slider element within the body, a laser module carrying a laser, engaged in a track curved in an arc of about ninety degrees, and a first link engaged pivotally to the lower slider element on a first end and pivotally to the laser module on a second end, stationary on a flat support surface, translating the upper slider along the longitudinal track, causing the laser module to move along the curved track and the laser to emit a beam through the lengthwise channel, until the laser beam illuminates the first point, reading from indicia along a curved window on one side of the device an angular position of the first point relative to the device, translating the upper slider along the longitudinal track until the laser beam illuminates the second point, reading from indicia along the curved window an angular position of the second point relative to the device, and determining the angular separation between the first and the second point by subtracting the angular deviation of the first point from the angular deviation of the second point.

In one embodiment the method further comprises a second link engaged pivotally to the lower slider element on a first end and pivotally to the laser module on a second end, the second link on a side of the curved track opposite the first link, and further comprising a second curved window on a second side of the body of the device and a second pointer extending laterally from the laser module opposite the first pointer, with indicia along both the first and the second window indicating arcuate rotation of the laser beam from a position with the slider fully retracted to a position with the slider fully extended, the method comprising reading angular deviation from either side of the device.

DETAILED DESCRIPTION OF THE INVENTION

Figure 1:
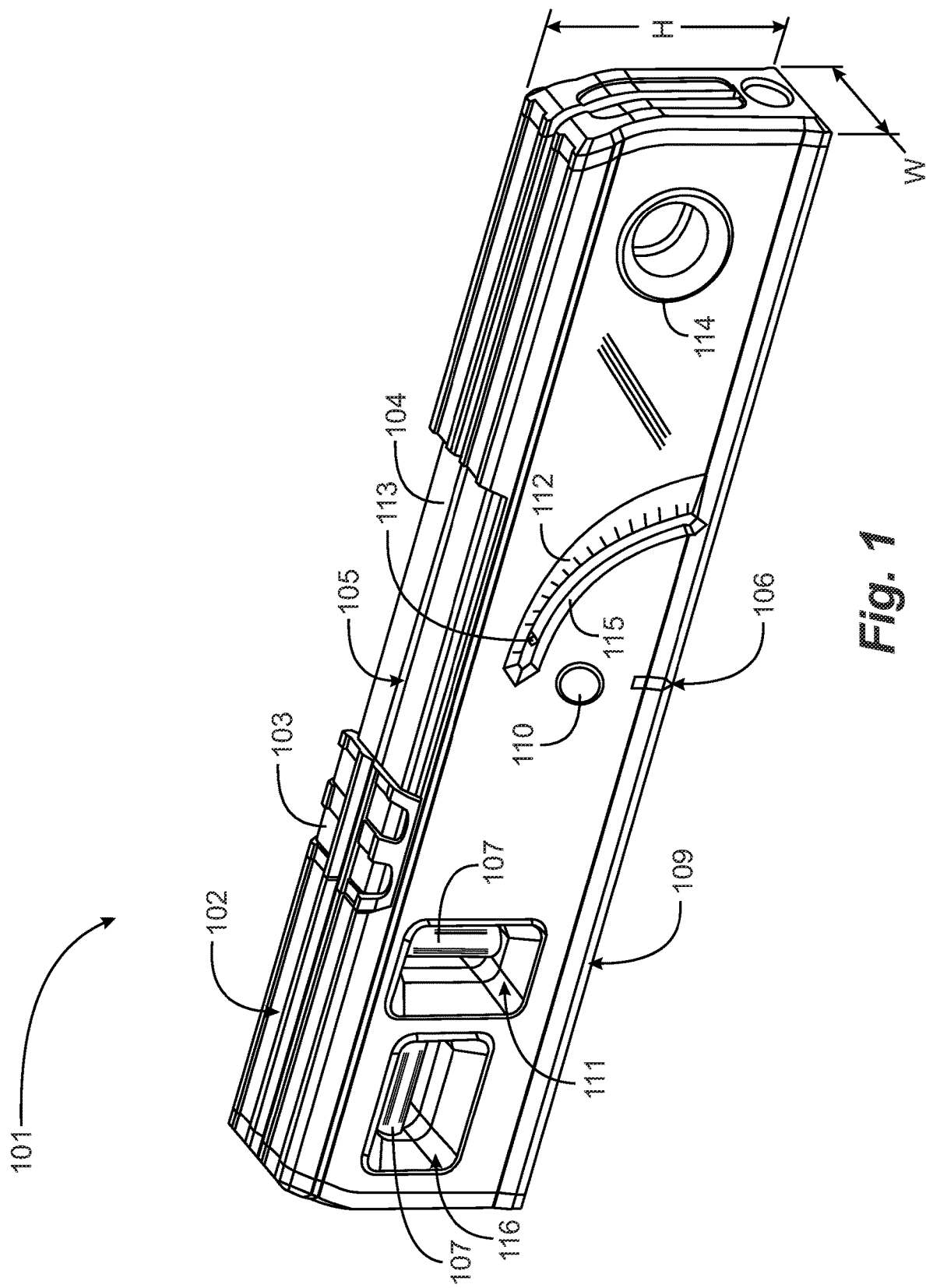
FIG. 1 is a perspective view of a laser level device in an embodiment of the present invention.

FIG. 1 is a perspective view of a laser level device 101 in an embodiment of the present invention. Device 101 has a body 102 comprising several parts assembled, and the body has a lower base surface 109 for intimate contact with flat surfaces in use. Body 102 is in one embodiment an assembly based on an aluminum extrusion and a number of molded polymer parts that are described further below. In FIG. 1 the overall width of device 101 is W and the overall height is H. In one embodiment W may be one inch and H may be two inches.

There are two openings 116 and 111 through body 102 in which bubble tube level indicators 107 are placed to be visible to a user. These bubble indicators are useful for a user to determine whether a horizontal surface is level or a vertical surface is plumb. A position pointer 106 ending at base surface 109 is a reference point for a user to position device 101 at a specific point for determining angular reference to other points in an environment.

In one embodiment an internal electro-mechanical mechanism comprising a laser module riding in an internal curved guide (not seen in FIG. 1) is connected by links not seen in FIG. 1 to a slider 103 constrained to a horizontal, longitudinal track 104. A user may translate slider 103 along track 104 which moves the laser module along the internal curved guide. A laser beam from the laser module is emitted through a slot 105 at an angle dependent on the position of slider 103 and the consequent position of the laser module along the curved guide. In one embodiment slot 105 is an open slot, and in another embodiment the slot may be closed by a transparent window. The laser is turned on and off by a pushbutton switch 403 described more fully below that is activated by a pushbutton operating element 110, as may be seen more clearly in FIG. 4. A curved window 115 through a side of body 102, in one embodiment comprising a transparent polycarbonate cover, shows a pointer 113 that moves along curved window 115 as the laser module is moved along the curved guide in the device. A scale 112 is provided that enables a user to read degree separation between a point touched by position pointer 106 and a point in the local environment spotted by the laser through manipulation of slider 103 along track 104. Further description of this process and elements interacting is provided below in enabling detail.

Figure 2:
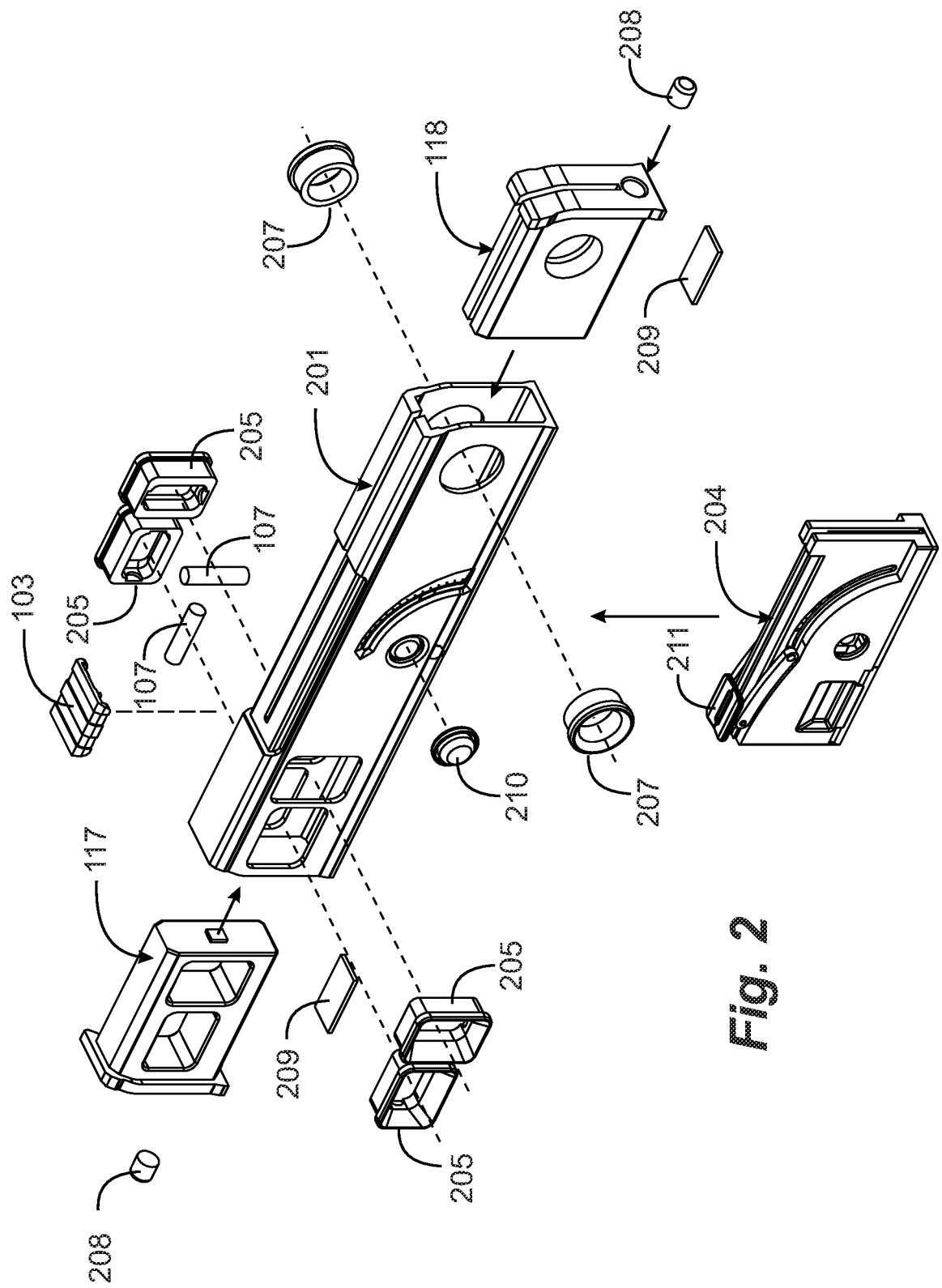
FIG. 2 is an exploded view of the laser level device of FIG. 1.

FIG. 2 is an exploded perspective view of device 101 of FIG. 1. The assembly is based on an aluminum extrusion 201. Extrusion 201 is open on both ends. End caps 117 and 118 fit into the open ends. Extrusion 201 also has an opening in the bottom plane accommodating an electromechanical assembly 204 that is fitted upward into the extrusion and fastened in place. Electromechanical assembly 204 comprises all the moving parts and electrical elements of the laser level device in embodiments of the invention.

Elements 209 are magnets that are inserted under end caps 117 and 118 before insertion into extrusion 201, and electromechanical assembly 204 is fitted to extrusion 201 from below and fastened in place. Slider 103 is then joined to lower slider element 204 through a longitudinal slot in extrusion 201. Once the end caps and the electromechanical assembly are joined to the extrusion, frames 205, as well as frames 207 are joined to the assembly, as may be seen in the assembled view FIG. 1. Bubble level components 107 are assembled to frames 205 before the frames are added to the assembly. End caps 117 and 118 further comprise spirit disc levels 208.

Figure 3:
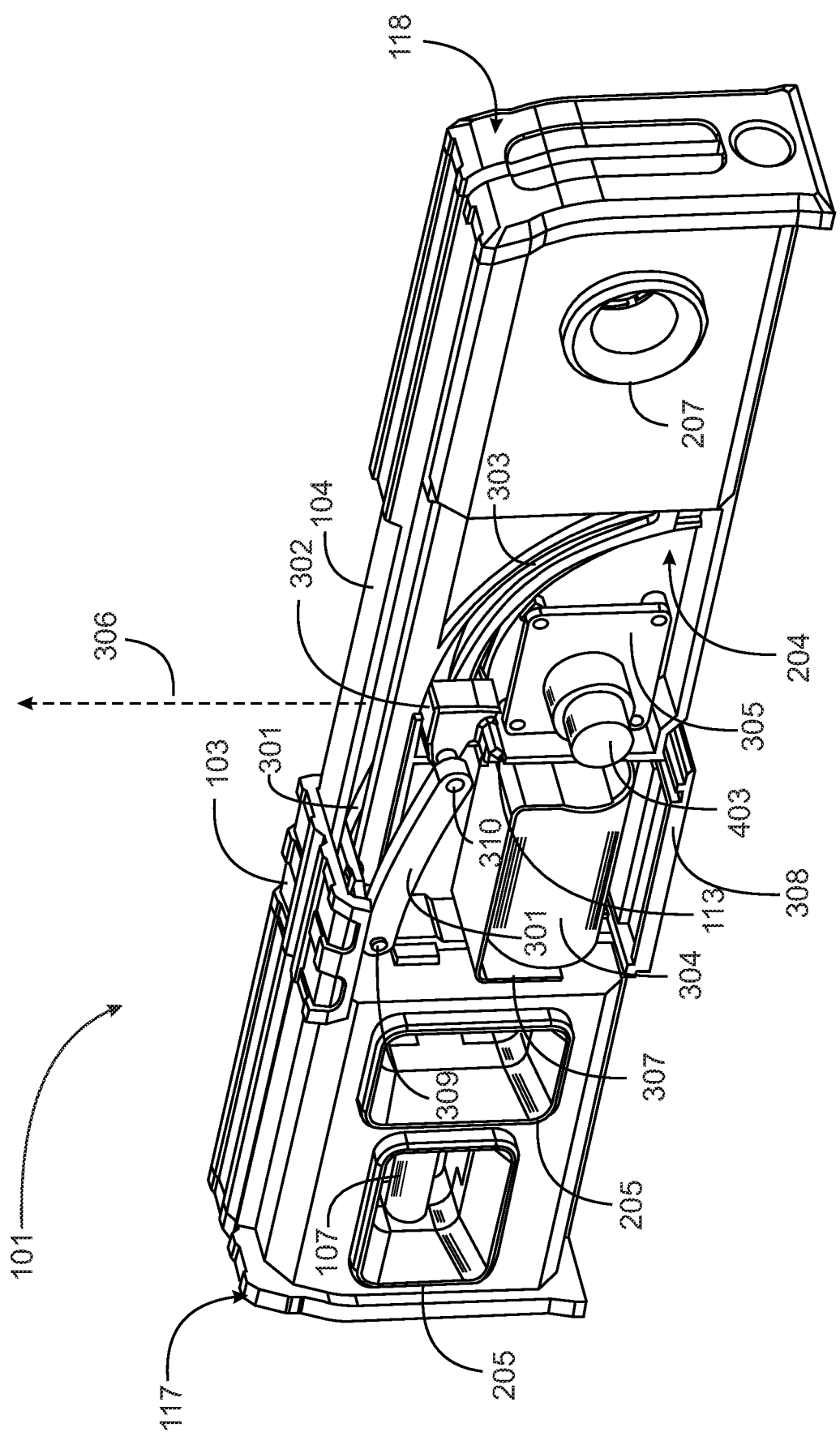
FIG. 3 is a perspective view of the laser level device with one side cut away.

FIG. 3 is a perspective view of laser level device 101 with one side of aluminum extrusion 201 and the front housing of the electromechanical assembly removed to be able to see more detail of electromechanical assembly 204.

Slider 103 may be seen in FIG. 3 engaged in track 104, for which just one-half of the track is visible, as one half of extrusion 201 is cut away to show the internal elements. Slider 103 assembled to lower slider element 211 is connected by pivoted links 301 by a pivot shaft 309 to a traveling laser module 302 which is engaged in and follows a curved track 303 as slider 103 is urged forward along track 104. A laser carried by laser module 302 directs a pinpoint laser beam vertically upward in FIG. 3, as shown by laser line 306, as slider 103 is fully retracted.

As slider 103 is urged forward along track 104 the direction of the laser beam travels through an arc determined by the curvature of track 303 until module 302 reaches the end of track 303, at which point the beam will have moved through an arc of about ninety degrees.

Laser module 302 is implemented to track 303 in very close tolerance, so there is little of no deviation of the laser beam due to mechanical play. In one embodiment the fit of slider 103 engaged to lower slider element 211 is also a close fit with some friction, so direction of the laser beam is retained when a user stops moving the slider, and the position of pointer 113 may be read from scale 112. It may be seen in FIG. 3 that pointer 113 is actually an extension laterally from laser module 302.

Although it is not shown in FIG. 1 or FIG. 3, laser module 302 has a second extension to a pointer 113 in the opposite lateral direction, as a curved window 115 and a scale 112 is also implemented on the opposite side of device 101 in FIG. 1, so a user may read the angle of the laser from either side.

Referring again to FIG. 3, power and control of device 101 is provided in one embodiment through electromechanical assembly 204, which comprises a battery 304. The device is turned on and off by a pushbutton switch 403 mounted on a printed circuit board 305. The printed circuit board provides control elements in operation of the device.

In prior art devices a laser module is implemented on the end of a single pivoted link that is pivoted near the base point 106. Such a link cannot be pivoted exactly at that point, so there is an inherent error in the arc implementation, and the device with this single link is limited to having a circular arc, which may require additional height for the device.

In the instant invention the laser module is guided in a track that describes a circular arc about point 106, so the laser moves as though it pivots about point 106. In alternative embodiments there may be two tracks and a telescoping arm to guide the laser module.

Figure 4:
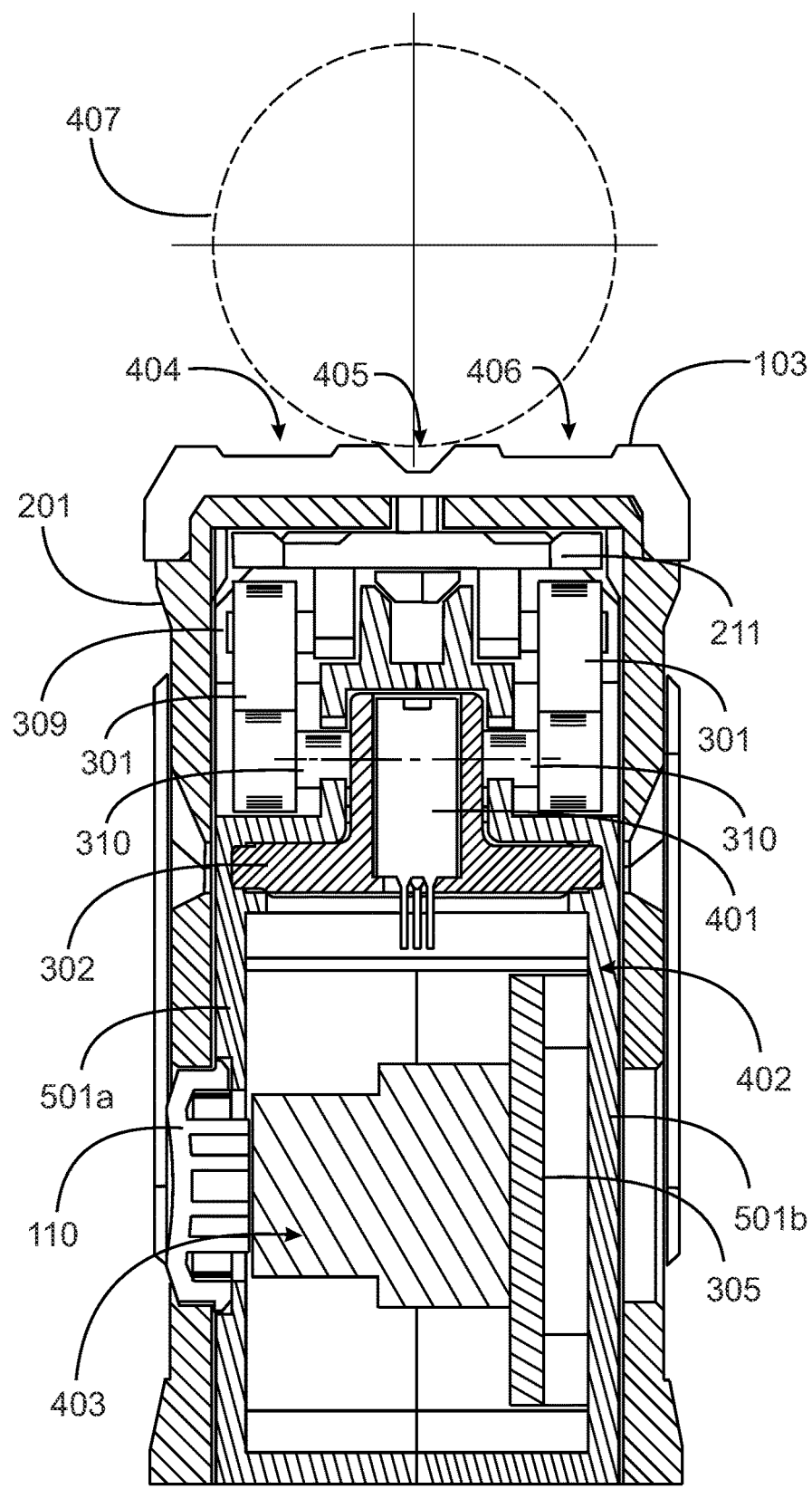
FIG. 4 is cross section of the laser level device of FIG. 1 taken at the midpoint through the on-off button.

FIG. 4 is a cross section of device 101 taken along a vertical plane orthogonal to the length of the device at a midpoint, passing through center of the pushbutton operating element 110. Slider 103 may be seen in FIG. 4 engaged through an upper portion of extrusion 201 to mating element 211 of electromechanical assembly 204. Slider element 104 and mating element 211 are not shown in section because the section plane is well forward of both. These two slider elements 103 and 211, having engaged, move together, urged by a user along track 104. The assembly of slider elements 103 and 211 are joined to links 301, as seen in FIG. 3 and in FIG. 4, by a pivot shaft 309, and the opposite ends of links 301 are joined by pivot posts 310 to laser module 302. As the slider assembly is moved along track 104 laser module 302 is moved by links 301 along curved track 303.

The engaged and moving elements the electro-mechanical assembly in FIG. 4 are assembled in a two-part housing having a first half 501a and a second half 501b, described in more detail below with reference to FIG. 5.

Another important feature seen in FIG. 4 is that slider element 103 is shaped laterally across the top to have three grooves 404, 405 and 406. Each groove has a flat bottom at a depth, and angled sides. FIG. 3 illustrates as well that the grooves as seen in cross section of FIG. 4 are also implemented in aluminum extrusion 201, so the grooves effectively continue the full length of the laser level device of the invention.

An important purpose of grooves 404, 405 and 406 is to engage conduits and pipes of different diameters with the laser level device in a manner that the device may be used with the bubble levels to determine level and plumb for such conduits and pipes. In FIG. 4 a dotted circle 407 represents a pipe or conduit engaged with center groove 405

Figure 5:
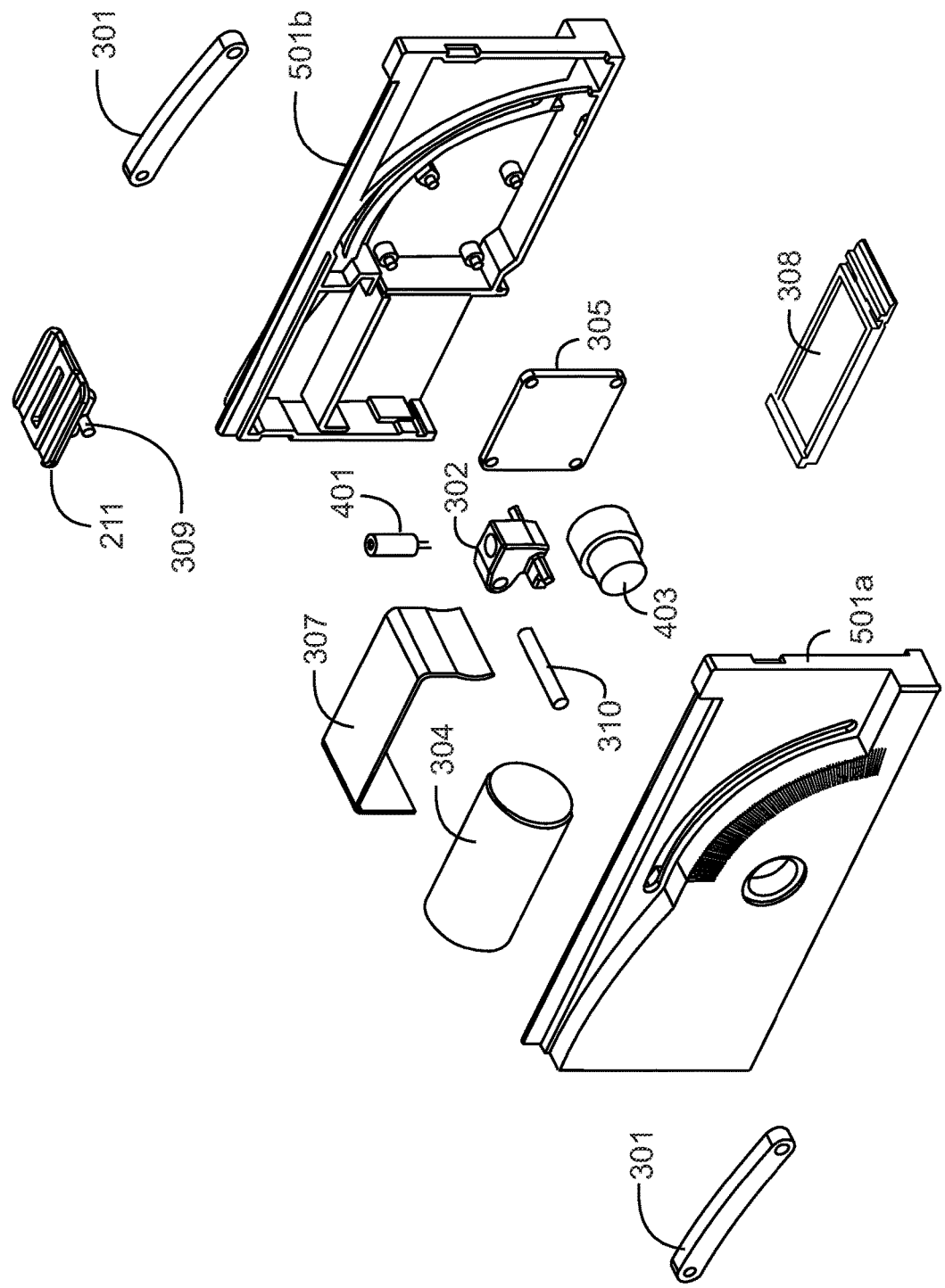
FIG. 5 is an exploded view of an electro-mechanical assembly of the device of FIG. 1.

FIG. 5 is an exploded view of electro-mechanical assembly 204 seen in perspective in FIG. 2. The two longitudinal halves 501a and 501b of the housing are shown separated. Slider element 211 is shown above with pivot shaft 309 to which links 301 engage. Pivot posts 310 extend from laser module 302 to each side, and the forward ends of links 301 engage these posts, as is seen in FIG. 4. Battery 304 is shown relative to housing 307, laser 401 is seen above module 302, printed circuit board 305 is shown, as well as on/off pushbutton 403. A battery door 308 is located below the battery module to provide access to the battery.

Figure 6:
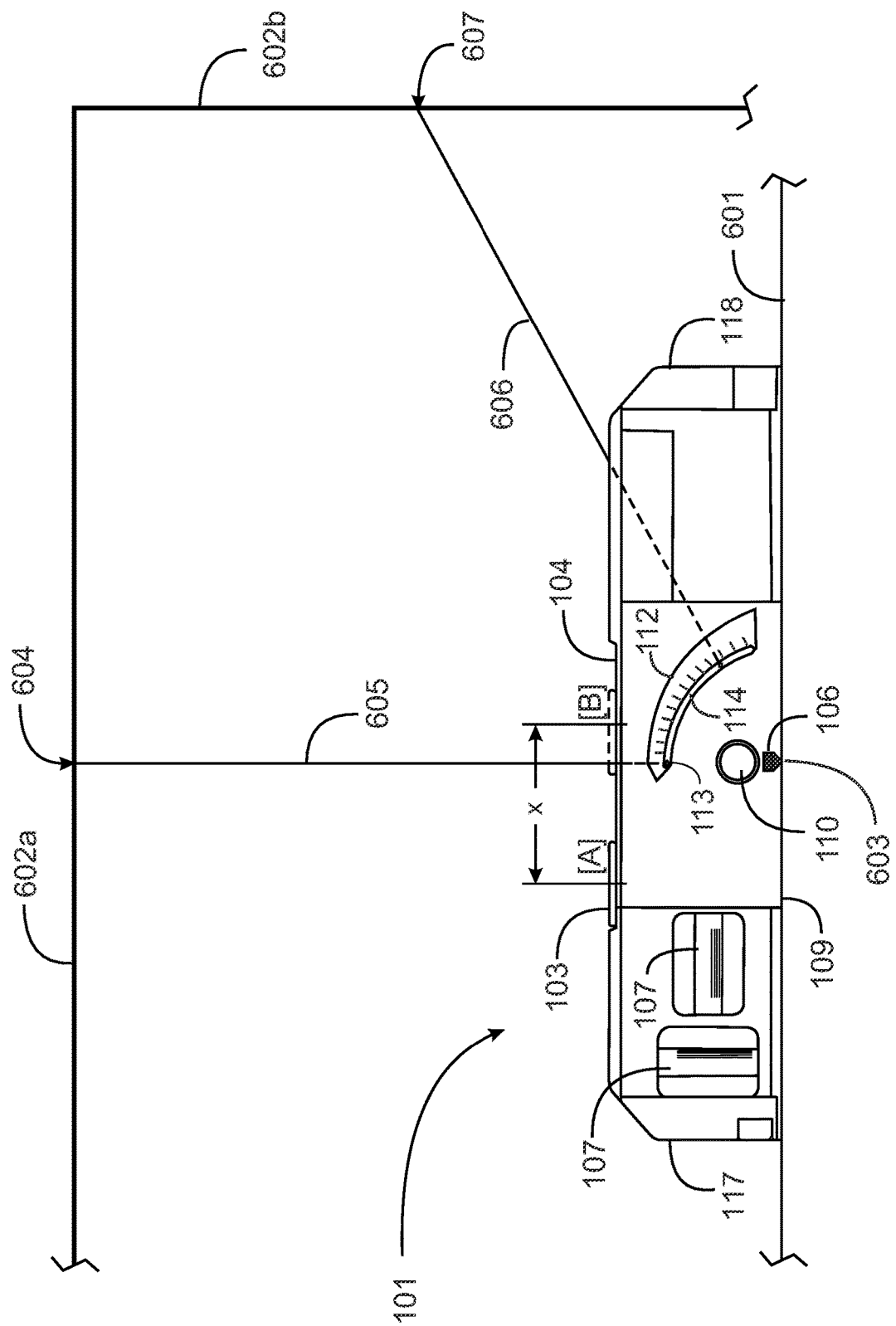
FIG. 6 is a side elevation view of a device according to an embodiment of the invention measuring an angular separation.

FIG. 6 is a side elevation view of a device 101 according to an embodiment of the invention measuring an angular separation. Device 101 is resting in this view on a flat, horizontal surface which may be a floor or a tabletop. This is not a limitation, as the device may be placed on any flat surface, not just a horizontal surface. The device in some uses may be placed on conduits or pipes as well. Marker 106 is matched with a point on the horizontal surface. Slider 103 is shown fully retracted at a first position [A], and with the slider in this position the laser module is positioned such that the laser produces a laser beam along a line 605 to a point 604 on ceiling 602a. Point 604 on the ceiling is thus demonstrated to be directly above point 603 on the floor or tabletop.

Slider 103 is also shown at a second position [B] a distance x along track 104. At this second position the laser module inside the device is moved along the curved track to a new position wherein the laser produces a beam along line 606. Pointer 113 is also shown at a new position in window 114. A user is enabled to read the angular separation between points 604 and 607 on scale 112. A user may manipulate the slider, and thus the laser beam, to determine angular separation between chosen points along walls of the ceiling in a room.

It will be apparent to the skilled person that the embodiments described above with reference to figures are entirely exemplary and are not limiting to the scope of the invention, in which there may be many other embodiments not described in detail. The scope of the invention is limited only by the claims that follow.

The invention claimed is:

1. A laser-level device, comprising:
   a body having a length, a height and a width, with a base, sides and a top;
   an upper slider engaging a longitudinal track along the top of the device, connected through a lengthwise channel to a lower slider element within the body;
   a laser module carrying a laser, engaged in a track curved in an arc of about ninety degrees; and
   a first link engaged pivotally to the lower slider element on a first end and pivotally to the laser module on a second end;
   wherein the laser module follows the track curvature in response to translation of the slider along the longitudinal track from a fully retracted position to a fully extended position, and the laser emits a laser beam through the central, lengthwise channel, the beam moving in an arc determined by the track curvature.

2. The laser-level device of claim 1 further comprising a curved window on a first side of the body of the device, and a first pointer extending laterally from the laser module, wherein the pointer follows the curvature of the curved window.

3. The laser-level device of claim 2 further comprising indicia along the curved window indicating arcuate rotation of the laser beam from a position with the slider fully retracted to a position with the slider fully extended.

4. The laser-level device of claim 2 further comprising a second link engaged pivotally to the lower slider element on a first end and pivotally to the laser module on a second end, the second link on a side of the curved track opposite the first link, and further comprising a second curved window on a second side of the body of the device and a second pointer extending laterally from the laser module opposite the first pointer, with indicia along both the first and the second window indicating arcuate rotation of the laser beam from a position with the slider fully retracted to a position with the slider fully extended.

5. The laser-level device of claim 2 further comprising a second link engaged pivotally to the lower slider element on a first end and pivotally to the laser module on a second end, the second link on a side of the curved track opposite the first link, and further comprising a second curved window on a second side of the body of the device and a second pointer extending laterally from the laser module opposite the first pointer, with indicia along both the first and the second window indicating arcuate rotation of the laser beam from a position with the slider fully retracted to a position with the slider fully extended, comprising reading angular deviation from either side of the device.

6. The laser-level device of claim 1 wherein the body is no more than one inch in width and no more than two inches in height.

7. The laser-level device of claim 1 wherein the body is based on an aluminum extrusion.

8. The laser-level device of claim 7 further comprising an electromechanical modular assembly comprising the laser module carrying a laser, the curved track, the lower slider element links engaged pivotally to the slider on a first end and pivotally to the laser module on a second end, the electromechanical modular assembly engaged to the body via an opening in the base of the body.

9. The laser-level device of claim 1 wherein the curved track is non-circular, radius of track increasing as the first slider extends further along the longitudinal track.

10. The laser-level device of claim 1 further comprising end caps engaging the body at openings on opposite ends.

11. The laser-level device of claim 10 wherein one of the end caps has a horizontal bubble level and a vertical bubble level.

12. The laser-level device of claim 1 wherein the electromechanical assembly further comprises a printed circuit board providing control functions, a battery providing power and an on-off switch that activates the laser.

13. The laser-level device of claim 1 wherein the body has a pointer on one side at a midpoint at the base, such that with the device resting on the base on a surface, with a point on the surface aligned with the pointer, the laser beam, with the first slider fully retracted, defines a vertical line through the pointer and the point on the surface.

14. The laser-level device of claim 1 further comprising one or more lengthwise channels along the top of the device, the channels having V-angled sides, such that that the device may be engaged to a conduit or a pipe along one of the channels.

15. A method determining angular separation between a first point and a second point on one or more surfaces, comprising:

placing a laser-level device having a body with a length, a height and a width, a base, sides and a top, with a upper slider engaging a longitudinal track along the top of the device, connected through a lengthwise channel to a lower slider element within the body, a laser module carrying a laser, engaged in a track curved in an arc of about ninety degrees, and a first link engaged pivotally to the lower slider element on a first end and pivotally to the laser module on a second end, stationary on a flat support surface;

translating the upper slider along the longitudinal track, causing the laser module to move along the curved track and the laser to emit a beam through the lengthwise channel, until the laser beam illuminates the first point;

reading from indicia along a curved window on one side of the device an angular position of the first point relative to the device;

translating the upper slider along the longitudinal track until the laser beam illuminates the second point;

reading from indicia along the curved window an angular position of the second point relative to the device; and determining the angular separation between the first and the second point by subtracting the angular deviation of the first point from the angular deviation of the second point.

* * * * *